United States Patent
Chacon

(10) Patent No.: US 12,440,464 B2
(45) Date of Patent: Oct. 14, 2025

(54) METHOD FOR TREATING RESPIRATORY VIRAL INFECTIONS COMPRISING ADMINISTRATION OF FATTY ACID COMPOSITIONS

(71) Applicant: Irazu Bio, Baltimore, MD (US)

(72) Inventor: Marco A. Chacon, Annapolis, MD (US)

(73) Assignee: Irazu Bio, Baltimore, MD (US)

( * ) Notice: Subject to any disclaimer, the term of this patent is extended or adjusted under 35 U.S.C. 154(b) by 435 days.

(21) Appl. No.: 17/997,604

(22) PCT Filed: Apr. 29, 2021

(86) PCT No.: PCT/US2021/029841
§ 371 (c)(1),
(2) Date: Oct. 31, 2022

(87) PCT Pub. No.: WO2021/222535
PCT Pub. Date: Nov. 4, 2021

(65) Prior Publication Data
US 2023/0218556 A1    Jul. 13, 2023

Related U.S. Application Data

(60) Provisional application No. 63/019,009, filed on May 1, 2020.

(51) Int. Cl.
| | | |
|---|---|---|
| *A61K 31/201* | (2006.01) | |
| *A61K 9/107* | (2006.01) | |
| *A61K 31/20* | (2006.01) | |
| *A61K 45/06* | (2006.01) | |
| *A61P 11/00* | (2006.01) | |
| *A61P 29/00* | (2006.01) | |
| *A61P 31/14* | (2006.01) | |

(52) U.S. Cl.
CPC ............ *A61K 31/201* (2013.01); *A61K 9/107* (2013.01); *A61K 31/20* (2013.01); *A61K 45/06* (2013.01); *A61P 11/00* (2018.01); *A61P 29/00* (2018.01); *A61P 31/14* (2018.01)

(58) Field of Classification Search
CPC .................................................... A61K 31/201
USPC ......................................................... 514/560
See application file for complete search history.

(56) References Cited

U.S. PATENT DOCUMENTS

| | | |
|---|---|---|
| 5,223,285 A | 6/1993 | DeMichele et al. |
| 5,716,972 A | 2/1998 | Adams et al. |
| 2004/0235726 A1 | 11/2004 | Jakubowski et al. |
| 2005/0059626 A1 | 3/2005 | Van Nest et al. |
| 2016/0129122 A1 | 5/2016 | Milne et al. |

FOREIGN PATENT DOCUMENTS

| | | |
|---|---|---|
| WO | 2006121767 A2 | 11/2006 |
| WO | 2012/058795 A1 | 5/2012 |
| WO | 2018/005527 A1 | 1/2018 |

OTHER PUBLICATIONS

Thormar H, et al., "Inactivation of enveloped viruses and killing of cells by fatty acids and monoglycerides." Antimicrobial Agents and Chemotherapy, vol. 31, No. 1, pp. 27-31. Jan. 1987.
Langlois P, et al., "Omega-3 polyunsaturated fatty acids in critically ill patients with acute respiratory distress syndrome: A systematic review and meta-analysis." Nutrition, vol. 61, pp. 84-92. May 2019.
International Search Report and Written Opinion of International Application No. PCT/US21/29841, mailed Jul. 22, 2021.
Das, "Can Bioactive Lipids Inactivate Coronavirus (COVID-19)?", Archives of Medical Research, Mar. 2020, pp. 282-286, vol. 51.
Coman et al., "Beta 3 adrenergic receptors: molecular, histological, functional and pharmacological approaches", Romanian Journal of Morphology and Embryology, 2009, pp. 169-197, vol. 50, No. 2.
Liu et al., "Anti-spike IgG causes severe acute lung injury by skewing macrophage responses during acute SARS-CoV infection", JCI Insight, 2019, vol. 4, No. 4, pp. 1-20, e123158.
Mayo Clinic Website "ARDS Overview", Oct. 25, 2022, pp. 1-3.

*Primary Examiner* — Raymond J Henley, III
(74) *Attorney, Agent, or Firm* — McBee Moore & Vanik IP, LLC

(57) ABSTRACT

Methods and compositions comprising free fatty acids for the treatment, including prevention, of viral infections, including the treatment of Acute Respiratory Distress Syndrome (ARDS). The compositions comprising free fatty acids, optionally linolenic acid, linoleic acid, and/or palmitic acid, may be used in methods for treating viral infections, optionally, coronavirus infections, for example, SARS-CoV, MERS-CoV, and/or SARS-CoV-2/COVID-19, and influenza virus infections, optionally, H1N1 and/or H5N1.

17 Claims, No Drawings

METHOD FOR TREATING RESPIRATORY VIRAL INFECTIONS COMPRISING ADMINISTRATION OF FATTY ACID COMPOSITIONS

CROSS-REFERENCE TO RELATED APPLICATIONS

This application is the National Stage entry of International Patent Application No. PCT/US21/29841, filed 29 Apr. 2021, which claims priority to U.S. Provisional Patent Application No. 63/019,009, filed 1 May 2020.

BACKGROUND

1. Field

The present disclosure relates to methods and compositions for treating respiratory viral infections, and complications thereof, preferably, Acute Respiratory Distress Syndrome (ARDS), comprising administration of fatty acid compositions.

2. Description of Related Art

Acute Respiratory Distress Syndrome (ARDS) occurs due to fluid buildup in alveoli in the lungs. This fluid prevents the lungs from completely filling with air, dropping the amount of oxygen taken up by the bloodstream. This causes a drop in the amount of oxygen reaching the tissues and organs, leading to tissue and organ damage, and eventually, death. ARDS may be caused by illness or injury. Mayo Clinic Website "ARDS Overview" (2020).

Severe acute respiratory syndrome coronavirus (SARS-CoV) causes fatal human respiratory disease. Subjects with SARS (hereafter referred to as SARS subjects) displayed the characteristics of acute lung injury (ALI), including diffuse alveolar damage (DAD), epithelial necrosis, and fibrin and hyaline deposition. Most subjects who die of SARS develop acute respiratory distress syndrome (ARDS), the most severe form of acute lung injury. Liu et al. JCI Insight (2019) 4(4): e123158. Outbreaks of severe acute respiratory infections of emerging viruses, including Middle Eastern respiratory syndrome CoVs (MERS-CoV), highly pathogenic influenza viruses (e.g., H5N1, H1N1, H7N9), and the novel coronavirus (COVID-19) show a need in the art for effective treatment of viral infections, including pulmonary distress that results from viral infections.

SUMMARY

In an embodiment, a method for treating a subject suffering from a viral infection may comprise administering a composition comprising an effective amount of a fatty acid, a derivative thereof, or a combination thereof to a patient in need. The viral infection may be a respiratory viral infection.

In an embodiment, a method for treating a patient suffering from acute respiratory distress syndrome (ARDS) may comprise administering a composition comprising an effective amount of a fatty acid, a derivative thereof, or a combination thereof to a patient in need.

In an embodiment, a method for the treatment of acute respiratory distress syndrome (ARDS) to reduce production of inflammatory cytokines may comprise administering a composition comprising an effective amount of a fatty acid, a derivative thereof, or a combination thereof to patient in need thereof.

In an embodiment, a method for the treatment of acute respiratory distress syndrome (ARDS) may comprise administering composition comprises an effective amount of a β3-adrenergic agonist, analogs thereof, or combinations thereof to mobilize free fatty acids from depot fat.

In an embodiment, a method for the treatment of acute respiratory distress syndrome (ARDS) may comprise administering composition comprising an effective amount of glucagon, analogs thereof, or combinations thereof to mobilize free fatty acids from depot fat.

In an embodiment, a patient is suffering from a viral infection. The viral infection may be a coronavirus, influenza A virus, influenza B virus, enterovirus, respiratory syncytial virus (RSV), parainfluenza, adenovirus, or a combination thereof. The coronavirus may be SARS-CoV, MERS-CoV, SARS-CoV-2/COVID-19, or a combination thereof. The coronavirus may be COVID-19. The influenza virus may be H1N1 or H5N1.

In an embodiment, the acute respiratory distress syndrome (ARDS) is caused by a bacterial respiratory infection. The bacterial infection may be *Bordetella pertussis* (Whooping Cough) or bacterial pneumonia.

In an embodiment, the Acute Respiratory Distress Syndrome (ARDS) is caused by injury, trauma, asthma, chronic obstructive pulmonary disease (COPD), bronchitis, emphysema, lung cancer, bronchiectasis, including as caused by Cystic Fibrosis, pneumonia, exposure to high altitude, ventilator related damage, shock, pleural effusion, sepsis, smoke inhalation, aspirating vomit, near-drowning episode, or a combination thereof.

In an embodiment, fatty acid may be arachidic acid, arachidonic acid, behenic acid, brassidic acid, butyric acid, capric acid, caproic acid, caproleic acid, caprylic acid, cerotic acid, dihomo-γ-linolenic acid (DGLA), docosahexaenoic acid (DHA), docosapentaenoic acid (DPA), eicosapentaenoic acid (EPA), elaidic acid, eurcic acid, gadoleic acid, lauric acid, lauroleic acid, lignoceric acid, linoelaidic acid, linolenic acid, linoleic acid, α-linoleic acid, γ-linoleic acid, mead acid, myristic acid, myristoleic acid, nervonic acid, oleic acid, palmitic acid, palmitoleic acid, pinolenic acid (columbinic acid), sapienic acid, stearic acid, vaccenic acid, α-linoleic acid, or a combination thereof. The composition may comprise a combination of oleic acid, linoleic acid, and palmitic acid.

In an embodiment, composition may comprise an oil. The oil may be a vegetable oil. The vegetable oil may be soybean oil, corn oil, sunflower oil, hemp seed oil, coconut oil, olive oil, canola oil, cottonseed oil, palm oil, peanut oil, safflower oil, sesame oil, or a mixture thereof. The oil may be a nut oil. The nut oil may be almond oil, beech nut oil, cashew oil, hazelnut oil, macadamia oil, mongongo nut oil (manketti oil), pecan oil, pistachio oil, walnut oil, pumpkin seed oil, or a mixture thereof.

In an embodiment, the composition may comprise a mixture of at least two oils. The composition may comprise a mixture of olive oil and soybean oil.

In an embodiment, the fatty acid derivative may be a Coenzyme A (CoA) derivative or a synthetic homologues thereof.

In an embodiment, the fatty acid may be a free fatty acid.

In an embodiment, the fatty acid may be an omega-3, omega-6, or omega-9 fatty acid.

In an embodiment, the fatty acid may be a short-chain fatty acid, medium-chain fatty acid, long-chain fatty acid, a very long chain fatty acid, or a combination thereof.

In an embodiment, the fatty acid may be a saturated fatty acid.

In an embodiment, the fatty acid may be an unsaturated fatty acid.

In an embodiment, the composition may be a pharmaceutical composition comprising an effective amount of a fatty acid and a carrier. The carrier may be an excipient, lubricant, antioxidant, emulsifier, stabilizer, solvent, diluent, buffer, vehicle, or a combination thereof. The composition may further comprise a phospholipid, water, isotonic solution, glycerin, salt, base, amino acid, sugar, antioxidant, or a mixture thereof. The composition may be formulated as an aerosol for administration via inhalation.

In an embodiment, the composition may be substantially free of arachidic acid, arachidonic acid, behenic acid, brassidic acid, butyric acid, capric acid, caproic acid, caproleic acid, caprylic acid, cerotic acid, dihomo-γ-linolenic acid (DGLA), docosahexaenoic acid (DHA), docosapentaenoic acid (DPA), eicosapentaenoic acid (EPA), elaidic acid, eurcic acid, gadoleic acid, lauric acid, lauroleic acid, lignoceric acid, linoelaidic acid, linoleic acid, α-linoleic acid, γ-linoleic acid, mead acid, myristic acid, myristoleic acid, nervonic acid, oleic acid, palmitic acid, palmitoleic acid, pinolenic acid (columbinic acid), sapienic acid, stearic acid, vaccenic acid, α-linoleic acid, or a combination thereof.

In an embodiment, the composition comprises less than 1% arachidic acid, arachidonic acid, behenic acid, brassidic acid, butyric acid, capric acid, caproic acid, caproleic acid, caprylic acid, cerotic acid, dihomo-γ-linolenic acid (DGLA), docosahexaenoic acid (DHA), docosapentaenoic acid (DPA), eicosapentaenoic acid (EPA), elaidic acid, eurcic acid, gadoleic acid, lauric acid, lauroleic acid, lignoceric acid, linoelaidic acid, linoleic acid, α-linoleic acid, γ-linoleic acid, mead acid, myristic acid, myristoleic acid, nervonic acid, oleic acid, palmitic acid, palmitoleic acid, pinolenic acid (columbinic acid), sapienic acid, stearic acid, vaccenic acid, α-linoleic acid, or a combination thereof by w/v.

In an embodiment, the composition may be substantially free of omega-3 fatty acids, omega-6 fatty acids, omega-9 fatty acids, or combinations thereof. The composition may comprise less than 1% of omega-3 fatty acids, omega-6 fatty acids, omega-9 fatty acids, or combinations thereof, by w/v.

In an embodiment, the composition may be substantially free of triglycerides. The composition may comprise less than 1% triglycerides by w/v.

In an embodiment, the composition may be substantially free of monoacylglycerols, diacylglycerols, triacylglycerols, or combinations thereof. The composition may comprise less than about 0.1%, 0.01%, or 0.001% w/v monoacylglycerols, diacylglycerols, triacylglycerols, or combinations thereof.

In an embodiment, the effective amount of the fatty acid in the composition may range from about 0.01 mM to 10 M.

In an embodiment, the effective amount of the fatty acid in the composition may range from about 1 ng to 10 g.

In an embodiment, the effective amount of the fatty acid in the composition may range from about 1 ng/mL to 10 g/mL.

In an embodiment, the effective amount of the fatty acid in the may comprise an oil in an amount between about 1 ng/mL to 10 g/mL.

In an embodiment, the effective amount of the fatty acid in the composition may range from about 1 ng/kg to 10 g/kg.

In an embodiment, the composition may have a pH between about pH 6 and pH 8.

In an embodiment, the composition comprising a fatty acid may be an emulsion.

In an embodiment, the composition comprising a fatty acid may be an aerosol.

In an embodiment, the composition comprising a fatty acid may be a suspension.

In an embodiment, the administration may comprise a subcutaneous, intramuscular, intravenous, intraperitoneal, vaginal, rectal, intrapleural, intravesicular, intrathecal, topical, nasal, inhalation, oral administration, or a combination of routes.

In an embodiment, the patient may be administered the composition about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60 minutes prior to the onset of acute respiratory distress syndrome (ARDS). The patient may be administered the composition about 1, 2, 3, 4, 5, 6, or 7 days prior to the onset of acute respiratory distress syndrome (ARDS). The patient may be administered the composition about 1, 2, 3, 4, 5, 6, or 7 days prior to the onset of acute respiratory distress syndrome (ARDS), optionally following onset of viral infection.

In an embodiment, the composition may be in a unit dosage form.

In an embodiment, the effective amount may be sufficient to raise the serum fatty acid levels in the patient. The effective amount may be sufficient to raise the serum ketone bodies levels in the patient.

In an embodiment, the effective amount may be sufficient to prevent viral infection in the patient. The viral infection may be a respiratory viral infection. The viral infection may be a coronavirus infection, preferably SARS-CoV-2.

In an embodiment, the effective amount results in the production of ketone bodies.

In an embodiment, the serum level of ketone bodies in the patient is higher as compared to a patient not administered a composition comprising fatty acids.

In an embodiment, the production of inflammatory cytokines is reduced, optionally by about 1% to 100% as compared to a patient not receiving the composition. The inflammatory cytokine may be interleukin-1 (IL-1), interleukin-1beta (IL-1β), interleukin-6 (IL-6), interleukin-12 (IL-12), interleukin-18 (IL-18), tumor necrosis factor-alpha (TNF-α), interferon gamma (IFN-γ), granulocyte-macrophage colony stimulating factor (GM-CSF), or a combination thereof.

In one embodiment, a method for treating a patient at risk for acute respiratory distress syndrome (ARDS) may comprise administering a composition comprising an effective amount of a fatty acid, a derivative thereof, or a combination thereof to a patient in need. The patient may be administered the composition about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60 minutes prior to the onset of acute respiratory distress syndrome (ARDS). The patient may be administered the composition about 1, 2, 3, 4, 5, 6, or 7 days prior to the onset of acute respiratory distress syndrome (ARDS). The patient may have been exposed to a virus. The patient may be seropositive for exposure to a virus. The patient may be seronegative for exposure to a virus.

In one embodiment, a method for treating a patient at risk for a viral infection may comprise administering a composition comprising an effective amount of a fatty acid, a derivative thereof, or a combination thereof to a patient in need. The patient may be administered the composition about 1, 2, 3, 4, 5, 6, or 7 days prior to the exposure to the virus. The viral infection may be a respiratory viral infection. The effective amount may be an amount sufficient to prevent viral infection in the patient.

In an embodiment, the composition may further comprise an anti-viral drug. The anti-viral drug may be TAMIFLU® (oseltamivir phosphate), RELENZA® (zanamivir), RAPIVAB® (peramivir), XOFLUZA® (baloxavir marboxil), Abacavir, Acycovir, Adefovir, Ampligen, Amprenavir, Umifenovir, Atzanavir, Atripla, Biktarvy, Boceprevir, Bulevirtide, Cidofovir, Cobicistate, Combivir, Daclatasvir, Darunavir, Delavirdine, Descovy, Didanosine, Docosanol, Dolutegravir, Doravirine, Edoxudine, Efavirenz, Elvitegravir, Emitcitabine, Enfuvirtide, Entecavir, Etravirine, Famciclovir, Fomivirsen, Fosmprevavir, Foscarnet, Ganciclovir, Ibacitabine, Ibalizumab, Idoxuridine, Imiquimod, Imunovir, Indinavir, Lamivudine, Letermovir, Lopinavir, Lovride, Maraviroc, Methiszone, Morxydine, Nelfinavir, Nexavir, Nitaxanide, Norvir, Oseltamivir, Penciclovir, Peramivir, Penciclovir, Peramivir, Pleconaril, Podophyllotoxin, Reltegravir, Remdesivir, Ribovirin, Rilpivirine, Rilpivirine, Rimadtadine, Ritonavir, Saquinavir, Sofosbuvir, Stavudine, Taribavirin, Telarevir, Telbivudine, Tenofovir alafenamide, Tenofovir disoproxil, Tipranavir, Tromatadine, Truvada, Umifenovir, Truvada, Umifenovir, Valaciclovir, Vicriviroc, Vidarabine, Zalcitabine, Zanamivir, Zidovudine, or a combination thereof. The anti-viral drug may be an RNA dependent RNA polymerase inhibitor. The anti-viral drug may be VEKLURY® (remdesivir).

In an embodiment, the composition comprising a fatty acid or a derivative thereof, may be administered to a patient suffering from a viral infection, before, in combination with, or after, administration of an anti-viral drug.

In an embodiment, the composition comprising a fatty acid or a derivative thereof, may be administered to a patient suffering from a viral infection, about 1, 2, 3, 4, 5, 6, 7, 8, 9, or 10 days prior to administration of an antiviral drug. The composition comprising a fatty acid or a derivative thereof, may be administered to a patient suffering from a viral infection, about 1, 2, 3, 4, 5, 6, 7, 8, 9, or 10 days after administration of an antiviral drug.

In an embodiment, use of a composition may comprise an effective amount of a fatty acid, a derivative thereof, or a combination thereof for the manufacture of a medicament for the treatment of acute respiratory distress syndrome (ARDS).

In an embodiment, the subject may be a human. The subject may be a human, domestic and/or farm animal, and zoo, sports, or pet animal. The subject may be a mammal. The mammal may be an alpaca, armadillo, capybara, cat, camel, chimpanzee, chinchilla, cow, dog, gerbil, goat, gorilla, hamster, horse, human, lemur, llama, mouse, non-human primate, pig, rat, sheep, shrew, squirrel, or tapir. Mammals include but are not limited to bovine, canine, equine, feline, murine, ovine, porcine, primate, and rodent species.

In an embodiment, use of a composition may comprise an effective amount of a fatty acid, a derivative thereof, or a combination thereof for the manufacture of a medicament for the treatment of acute respiratory distress syndrome (ARDS) to reduce production of inflammatory cytokines.

In an embodiment, use of a composition may comprise an effective amount of a β3-adrenergic agonist, analogs thereof, or combinations thereof to mobilize free fatty acids from depot fat for the manufacture of a medicament for the treatment of acute respiratory distress syndrome (ARDS).

In an embodiment, use of a composition may comprise an effective amount of glucagon, analogs thereof, or combinations thereof to mobilize free fatty acids from depot fat for the manufacture of a medicament for the treatment of acute respiratory distress syndrome (ARDS).

In one embodiment, a composition for the treatment of acute respiratory distress syndrome (ARDS) may comprise an effective amount of a fatty acid, a derivative thereof, or a combination thereof.

In one embodiment, a composition for the treatment of acute respiratory distress syndrome (ARDS) may comprise an effective amount of a β3-adrenergic agonist, analogs thereof, or combinations thereof to mobilize free fatty acids from depot fat.

In one embodiment, a composition for the treatment of acute respiratory distress syndrome (ARDS) may comprise an effective amount of glucagon, analogs thereof or combinations thereof to mobilize free fatty acids from depot fat.

In an embodiment, use of a composition may comprise an effective amount of a fatty acid, a derivative thereof or a combination thereof for the manufacture of a medicament for the treatment of a viral infection.

In an embodiment, use of a composition may comprise an effective amount of a fatty acid, a derivative thereof, or a combination thereof for the manufacture of a medicament for the treatment of viral infection to prevent infection by a virus.

In an embodiment, use of a composition comprising an effective amount of a β3-adrenergic agonist, analogs thereof, or combinations thereof to mobilize free fatty acids from depot fat for the manufacture of a medicament for the treatment of a viral infection.

In an embodiment, use of a composition comprising an effective amount of glucagon, analogs thereof, or combinations thereof to mobilize free fatty acids from depot fat for the manufacture of a medicament for the treatment of viral infection.

In an embodiment, a composition for use in the treatment of viral infection may comprise an effective amount of a fatty acid, a derivative thereof, or a combination thereof.

In an embodiment, a composition for use in the treatment of viral infection may comprise an effective amount of a β3-adrenergic agonist, analogs thereof, or combinations thereof to mobilize free fatty acids from depot fat.

In an embodiment, a composition for the treatment of viral infection may comprise an effective amount of glucagon, analogs thereof, or combinations thereof to mobilize free fatty acids from depot fat.

DETAILED DESCRIPTION OF A PREFERRED EMBODIMENT

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

Definitions

Unless otherwise indicated, all terms used herein have the same meaning as they would to one skilled in the art.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

"Acute Respiratory Distress Syndrome (ARDS)," as used herein, refers broadly to a condition which damages the alveoli of a subject's lungs, inhibiting absorption of oxygen into the bloodstream. The lack of sufficient oxygen in the bloodstream leads to tissue and organ damage, and may lead to death of the subject.

"Effective amount," as used herein, refers broadly to the amount of the active agent, e.g., fatty acids, to have a therapeutic effect on the subject. The therapeutic effect, includes, but is not limited to, raising free fatty acid serum levels, triggering a protective response, creating a state of hypoxia tolerance, resulting in and/or providing relief from a disease state.

"Free fatty acids," as used herein, refers broadly to non-esterified carboxylic acids with aliphatic chains of different lengths, which are either saturated or unsaturated.

"Mammal," as used herein, refers broadly to warm-blooded vertebrate animals of the class Mammalia, characterized by a covering of hair on the skin and, in the female, milk-producing mammary glands for nourishing the young. Mammals include, but are not limited to, humans, domestic and farm animals, and zoo, sports, or pet animals. Examples of mammals include but are not limited to alpacas, armadillos, capybaras, cats, camels, chimpanzees, chinchillas, cattle, dogs, gerbils, goats, gorillas, hamsters, horses, humans, lemurs, llamas, mice, non-human primates, pigs, rats, sheep, shrews, squirrels, and tapirs. Mammals include but are not limited to bovine, canine, equine, feline, murine, ovine, porcine, primate, and rodent species. Mammal also includes any and all those listed on the Mammal Species of the World maintained by the National Museum of Natural History, Smithsonian Institution in Washington D.C. Similarly, the term "subject" or "patient" includes both human and veterinary patients (subjects).

"Medium-chain fatty acids," as used herein, refers broadly to fatty acids with aliphatic tails of about six to twelve carbons.

"Long-chain fatty acids," as used herein, refers broadly to fatty acids with aliphatic tails of about thirteen to twenty-one carbons.

"Subjects," as used herein, refers broadly to any subject in need of treatment. "Patient" and "subject" are used interchangeably.

"Parenteral administration," as used herein, refers broadly to any route of administration that does not involve drug absorption via the GI tract. For example, intravenous, intramuscular, subcutaneous, and/or transdermal administration.

"Seropositive," as used herein, refers broadly to a condition where a subject has a positive serum reaction to a test, especially in a test for the presence of an antibody specific for a pathogen. For example, a seropositive subject may show a positive serum reaction for the presence of anti-coronavirus antibodies. Seropositivity is an indicator of exposure to the pathogen.

"Short-chain fatty acids," as used herein, refers broadly to fatty acids with aliphatic tails of about six or fewer carbons.

"Substantially free," as used herein, refers broadly to the presence of a specific component in an amount less than 1%, preferably less than 0.1% or 0.01%. More preferably, the term "substantially free" refers broadly to the presence of a specific component in an amount less than 0.001%. The amount may be expressed as w/w or w/v depending on the composition.

"Triglyceride," as used herein, refer broadly to three fatty acids bound to a glycerol backbone via ester bonds.

"Treatment," as used herein, refers broadly to alleviating signs and/or symptoms of a disease or injury condition. Treatment may encompass prophylactic measures, where the therapeutic composition is administered prior to the development of signs and/or symptoms or exposure to the disease or injury condition lessen the development of signs and/or symptoms of a disease or injury condition.

"Unit dosage form," as used herein, refers broadly to physically discrete units suitable as unitary dosages for human and animal subjects, each unit containing a predetermined quantity of the composition of the present invention, alone or in combination with other active agents, calculated in an amount sufficient to produce the desired effect, in association with a pharmaceutically acceptable diluent, carrier, or vehicle, where appropriate.

"Very long-chain fatty acids," as used herein, refers broadly to fatty acids with aliphatic tails of about twenty-two or more carbons.

Protective Effect of Fatty Acids

In their natural setting, mammals exhibit hypoxia tolerance and neuroprotection in response to physical and environmental stressors. Some circumstances, including caloric restriction models, pre-weaned mammals, and hibernators, show enhanced hypoxia tolerance and neuroprotective responses. While the mechanisms involved in such protection mechanisms are likely to be multi-factorial, the inventor surprisingly discovered that a possible master trigger mechanism involves the mobilization of fatty acids from adipose fat and the synthesis of ketone bodies. The inventor found that caloric restriction models, pre-weaned mammals, and hibernators all show increased plasma levels of free fatty acids and ketone bodies. This increase in the serum levels of ketone bodies is believed to provide a protective effect, including against viral infections.

Free fatty acids and their CoA thioesters are involved in transcriptional regulation. These factors are also involved in the regulation of energy utilization and oxygen homeostasis. In short, mammals have a protective physiological response that offers a more efficient biochemistry which results in energy conservation and reduced oxygen consumption. This protective physiological response is required for survival during periods of stress, e.g., during intermittent periods of famine, traumatic events, and extremes of temperature.

Without wishing to be bound to any specific theory, the inventor surprisingly discovered that it was possible to reproduce this more efficient biochemistry by providing an at-will "Lipid Trigger Mechanism" to reduce oxygen consumption in a subject to complement the standard clinical care that involves air and oxygen replacement therapies that are used (with limited success) during acute pulmonary decompensation. The administration of a composition comprising a fatty acid will increase serum fatty acid levels and provides a protective effect to subjects suffering from acute respiratory distress syndrome (ARDS), such as that caused by severe viral respiratory infections. According to the methods described herein, an increase in the serum level of fatty acids in an organism leads to induction of hypoxia tolerance at the cellular level and protection from global hypoxemia arising from acute respiratory distress syndrome (ARDS).

Acute respiratory distress syndrome (ARDS) may be caused by a viral respiratory infection, including but not limited to coronaviruses (SARS-CoV, SARS, MERS, SARS-CoV-2/COVID-19), influenza viruses, including influenza A or B viruses (e.g., "swine flu" H1N1, "bird flu" H5N1), enterovirus, respiratory syncytial virus (RSV), parainfluenza, or adenovirus.

Acute respiratory distress syndrome (ARDS) may be caused by a bacterial respiratory infection, including but not limited to *Bordetella pertussis* (Whooping Cough), bacterial pneumonia.

Acute respiratory distress syndrome (ARDS) may be caused by injury, trauma, asthma, chronic obstructive pulmonary disease (COPD), bronchitis, emphysema, lung cancer, bronchiectasis, including as caused by Cystic Fibrosis, ventilator related damage, shock, exposure to high altitudes, pneumonia, pleural effusion, sepsis, smoke inhalation, aspirating vomit, near-drowning episode, or a combination thereof.

Anti-Viral Properties of Fatty Acids

The fatty acids used in the methods and compositions described herein may act to treat viral infections, preferably respiratory viral infections. Without wishing to be bound to any specific theory, the fatty acids, preferably linoleic acid, may competitively bind hydrophobic areas on the surface of a virus, preventing it from binding to host cell, and, subsequently, infecting the host. For example, the fatty acid, preferably linoleic acid, may bind the spike (S) glycoprotein on a SAS-CoV2 virus to prevent it from binding to a host cell. The fatty acid, preferably linoleic acid, may bind to hydrophobic structural domains rendering the virus unable to infect the epithelia of hosts. For example, the free fatty acids and derivatives described herein, may bind to hydrophobic structural areas on the surface of a virus, providing interference with binding to the surface of a host cell, thereby preventing infection.

Fatty acids, including free fatty acids, and derivatives, and compositions described herein may be administered to a subject at risk for viral infection to prevent a virus from binding to the surface of host epithelia cells. For respiratory viruses, the fatty acids, including free fatty acids, and derivatives, and compositions described herein may reduce binding of a respiratory virus to epithelial cells in the nasal, laryngeal area, or both.

Fatty acids, including free fatty acids, and derivatives, and compositions described herein may be administered to a patient suffering from a viral infection to reduce the binding of a virus to the surface of host epithelial cells. For respiratory viruses, the fatty acids, including free fatty acids, and derivatives, and compositions described herein may reduce binding of a respiratory virus to epithelia cells in the nasal, laryngeal area, or both.

Viral infections may be treated or prevented by administration of a composition comprising a fatty acid described herein. Viral infections preferably include viral respiratory infections, including but not limited to coronaviruses (e.g., SARS-CoV, SARS, MERS, SARS-CoV-2/COVID-19), influenza viruses, including influenza A or B viruses (e.g., "swine flu" H1N1, "bird flu" H5N1), enterovirus, respiratory syncytial virus (RSV), parainfluenza, or adenovirus. The fatty acids used in the methods and compositions described herein may act to treat SARS-CoV, SARS, MERS, SARS-CoV-2/COVID-19 infections.

In addition to respiratory viruses, the fatty acids, including free fatty acids, and derivatives, and compositions described herein may reduce binding of a virus to epithelial cells in the oral cavity, vaginal area, rectal area, or both. Viruses that may infect the epithelial cells in the vaginal area, rectal area, or both, include but are not limited to HIV, papillomavirus, e.g., human papillomavirus (HPV), herpes, e.g., herpes simplex 1 (HSV-1) and herpes simplex 2 (HSV-2), or a combination thereof.

The compositions described herein may comprise the fatty acids, preferably free fatty acids, described herein. The compositions may further comprise an anti-viral drug.

Fatty Acids

The fatty acids used in the methods described herein may be free fatty acids. The fatty acids used in the methods described herein may be saturated or unsaturated fatty acids. The unsaturated fatty acids used in the methods described herein may be omega-3 fatty acids, omega-6 fatty acids, omega-9 fatty acids, or combinations thereof. Alternatively, the fatty acids may not be unsaturated fatty acids.

The fatty acids used in the methods described herein may be oleic acid, linoleic acid, palmitic acid, or a combination thereof. The fatty acids used in the methods described herein may be a short-chain fatty acid, medium-chain fatty acid, long-chain fatty acid, a very long chain fatty acid, or a combination thereof.

The fatty acids used in the methods described herein may be a saturated fatty acid.

The fatty acids used in the methods described herein may be an unsaturated fatty acid.

The fatty acids used in the methods described herein may be arachidic acid, arachidonic acid, behenic acid, brassidic acid, butyric acid, capric acid, caproic acid, caproleic acid, caprylic acid, cerotic acid, dihomo-γ-linolenic acid (DGLA), docosahexaenoic acid (DHA), docosapentaenoic acid (DPA), eicosapentaenoic acid (EPA), elaidic acid, eurcic acid, gadoleic acid, lauric acid, lauroleic acid, lignoceric acid, linoelaidic acid, linolenic acid, linoleic acid, α-linoleic acid, γ-linoleic acid, mead acid, myristic acid, myristoleic acid, nervonic acid, oleic acid, palmitic acid, palmitoleic acid, pinolenic acid (columbinic acid), sapienic acid, stearic acid, vaccenic acid, α-linoleic acid, or a combination thereof.

TABLE 1

Saturated and Unsaturated Fatty Adds

| Common Name | Saturated/Unsaturated | C:D | IUPAC |
| --- | --- | --- | --- |
| Caproleic acid | Monounsaturated | 10:1 | |
| Lauroleic acid | Monounsaturated | 12:1 | |
| Myristoleic acid | Unsaturated | 14:1 | 14:1(9) |
| Palmitoleic acid | Unsaturated | 16:1 | 16:1(9) |
| Sapienic acid | Unsaturated | 16:1 | 16:1(6) |
| Oleic acid | Unsaturated | 18:1 | 18:1(9) |
| Elaidic acid | Unsaturated | 18:1 | |
| Vaccenic acid | Unsaturated | 18:1 | |
| Linoleic acid | Unsaturated | 18:2 | 18:2(9, 12) |
| Linoelaidic acid | Unsaturated | 18:2 | |
| α-Linoleic acid | Unsaturated | 18:3 | 18:3(9, 12, 15) |
| γ-Linoleic acid | Unsaturated | 18:3 | |
| Pinolenic acid | Unsaturated | 18:3 | |
| Stearidonic acid | Unsaturated | 18:4 | |
| Gadoleic acid | Monounsaturated | 20:1 | |
| Mead acid | Unsaturated | 20:3 | |
| Arachidonic acid | Unsaturated | 20:4 | 20:4(5, 8, 11, 14) |
| Ecosapentaenoic acid (EPA) | Unsaturated | 20:5 | 20:5(5, 8, 11, 14, 17) |
| Brassidic acid | Monounsaturated | 22:1 | |
| Erucic acid | Unsaturated | 22:1 | 22:1(13) |
| Docosapentaenoic acid (DPA) | Unsaturated | 22:5 | |
| Docosahexaenoic acid (DHA) | Unsaturated | 22:6 | 22:6(4, 7, 10, 13, 16, 19) |
| Nervonic acid | Monounsaturated | 24:1 | |
| Butyric acid | Saturated | 4:0 | |
| Caproic acid | Saturated | 6:0 | |
| Caprylic acid | Saturated | 8:0 | |
| Capric acid | Saturated | 10:0 | |
| Lauric acid | Saturated | 12:0 | |

TABLE 1-continued

Saturated and Unsaturated Fatty Acids

| Common Name | Saturated/Unsaturated | C:D | IUPAC |
|---|---|---|---|
| Myristic acid | Saturated | 14:0 | |
| Palmitic acid | Saturated | 16:0 | |
| Stearic acid | Saturated | 18:0 | |
| Arachidic acid | Saturated | 20:0 | |
| Behenic acid | Saturated | 22:0 | |
| Lignoceric acid | Saturated | 24:0 | |
| Cerotic acid | Saturated | 26:0 | |

The fatty acids used in the methods described herein may be derived from plants. For example, the fatty acids may be derived from vegetable oil. The vegetable oil may be soybean oil, corn oil, sunflower oil, hemp seed oil, coconut oil, olive oil, canola oil, cottonseed oil, palm oil, peanut oil, safflower oil, sesame oil, or a mixture thereof. The fatty acids may be derived from olive oil. The fatty acids may be derived from a nut oil. The nut oil may be almond oil, beech nut oil, cashew oil, hazelnut oil, macadamia oil, mongongo nut oil (manketti oil), pecan oil, pistachio oil, walnut oil, pumpkin seed oil, or a mixture thereof. For example, the composition comprising fatty acids may comprise a mixture of olive oil and soybean oil.

Derivatives

The compositions described herein may comprise free fatty acids derivatives. Fatty acid derivatives include but are not limited to Co-Enzyme A derivatives, fatty acid esters, and combinations thereof.

Inflammatory Cytokines

The composition described herein may reduce the production of inflammatory cytokine in a subject, including a subject suffering from ARDS. The production of inflammatory cytokine in a subject, including a subject suffering from ARDS, may be reduced by administration of a composition described herein as compared to a subject not receiving the composition described herein.

Cytokine storms are a complication of respiratory diseases caused by coronaviruses such SARS and MERS. The composition described herein may be used to prevent the occurrence or reduce the severity of a cytokine storm that occurs as a result of ARDS.

Inflammatory cytokines reduced by administration of the composition described herein include but are not limited to interleukin-1 (IL-1), interleukin-1beta (IL-1β), interleukin-6 (IL-6), interleukin-12 (IL-12), interleukin-18 (IL-18), tumor necrosis factor-alpha (TNF-α), interferon gamma (IFN-γ), granulocyte-macrophage colony stimulating factor (GM-CSF), or a combination thereof.

The compositions described herein may reduce the production of inflammatory cytokines by about 1% to 99%. The production of inflammatory cytokines may be reduced by about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% after administration of a composition described herein.

The compositions comprising fatty acids described herein may reduce inflammation in subjects, including in subjects suffering from ARDS. The reduction in inflammation may be exemplified by a reduction in the production of inflammatory cytokines and inflammatory markers in the subject as compared to a subject not receiving the composition described herein.

Exemplary inflammatory markers include C-reactive protein (CRP), receptor for advanced glycation end-products (RAGE), angiopoietin-2 (Ang-2), surfactant protein D (SP-D), and Inteleukin-8 in the subjects' plasma. Fas, ligand, procollagen peptide (PCP) I and III in the subjects' bronchoalveolar lavage fluid (BALF). And, possibly, octane, acetaldehyde, and 3-methylheptane measured in exhaled air from the subject. Other biomarkers of ARDS inflammation include, but are not limited to interleukin-6 (IL-6), interleukin-8 (IL-8), interferon gamma (IFN-γ), surfactant proteins (SPD and SPB), von Willebrand factor antigen, angiopoietin 1/2 and plasminogen activator inhibitor-1 (PAI-1). Any one or a combination of these biomarkers may be measured to determine the effectiveness of the compositions described herein. For example, a subject administered a composition described herein may show a reduction in the amount of any one or a combination of these biomarkers.

β3-Adrenergic Agonists

In one embodiment, β3-adrenergic agonists and analogs thereof may be administered to a subject, including a subject suffering, from ARDS, to mobilize free fatty acids from depot fat. β3-adrenergic agonists and analogs thereof include but are not limited to CL-316243, Mirabegron, BRL-37344, β3-adrenergic agonists may be included in the compositions described herein.

Glucagon

In one embodiment, glucagon and analogues thereof may be administered to a subject, including a subject suffering from ARDS, to mobilize free fatty acids from depot fat. Glucagon and analogs thereof include but are not limited to glucagon like peptide 1 (GLP-1), Jardiance® (empagliflozin), liraglutide (GLP-1 mimetic), and Ozempic® (semaglutide). Glucagon and analogues thereof may be included in the compositions described herein.

Compositions

The compositions described herein may generally comprise one or more components. For example, a composition may comprise at least one fatty acid in an emulsion, e.g., the composition comprises a fatty acid and an aqueous solution. In terms of fatty acid amounts, these generally refer to the amount of fatty acid in the fatty acid component of the composition. For example, a composition comprising 80% linoleic acid may refer to an emulsion comprising 20% fatty acids by w/w and 80% aqueous solution w/w. The 20% of the total w/w of the composition would comprise 80% linoleic acid.

Compositions may comprise one or more of the fatty acids described herein. The composition may comprise a single fatty acid or a combination of fatty acids. For example, the composition may comprise equal amounts of at least two different fatty acids. The composition may comprise unequal amounts of at least two different tatty acids. The composition may comprise 1, 2, 3, 4, 5, 6, 7, 8, 9, or 10 fatty acids. The fatty acid percentage of a composition may comprise about 1% to 99% of a first fatty acid and about 1% to 99% of a second fatty acid. For example, in any given combination, the fatty acid percentage of a composition may comprise about 1% to 99% of any fatty acid. The fatty acid percentage of a composition may comprise about 1%, 2%, 3%, 4%, 5%, 6%, 7%, 8%, 9%, 10%, 11%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% of any fatty acid. In one embodiment, the fatty acid percentages generally refer to the amount of fatty acid in the fatty acid component of a composition.

In an aspect, the disclosure provides for a composition comprising about 1% to 99%, about 5% to about 80%, about 5% to about 60%, about 10% to about 50%, about 20% to about 75% of a first fatty acid and about 1% to 99%, about 1% to 99%, about 5% to about 80%, about 5% to about 60%, about 10% to about 50%, about 20% to about 75% of a second fatty acid. For example, a composition may comprise about 1% to 99%, about 5% to about 80%, about 5% to about 60%, about 10% to about 50%, about 20% to about 75% of a first fatty acid; about 1% to 99%, about 1% to 99%, about 5% to about 80%, about 5% to about 60%, about 10% to about 50%, about 20% to about 75% of a second fatty acid; and about 1% to 99%, about 1% to 99%, about 5% to about 80%, about 5% to about 60%, about 10% to about 50%, about 20% to about 75% of a third fatty acid. A composition as described herein may comprise about 1% to 99%, about 5% to about 80%, about 5% to about 60%, about 10% to about 50%, about 20% to about 75% of a first fatty acid; about 1% to 99%, about 1% to 99%, about 5% to about 80%, about 5% to about 60%, about 10% to about 50%, about 20% to about 75% of a second fatty acid; and about 1% to 99%, about 1% to 99%, about 5% to about 80%, about 5% to about 60%, about 10% to about 50%, about 20% to about 75% of a third fatty acid. In one embodiment, the fatty acid percentages generally refer to the amount of fatty acid in the fatty acid component of a composition.

For example, the fatty acid percentages of a composition described herein may be about 10% oleic acid. 10% linoleic, and 80% palmitic. The fatty acid percentages of a composition described herein may be about 40% to 60% linoleic acid, 15% to 35% oleic acid, 5% to 20% palmitic acid, 3 to 15% α-linolenic acid, and 1 to 6% stearic acid. For example, the fatty acid percentages of a composition described herein may be about 44% to 62% linoleic acid, 19% to 30% oleic acid, 7% to 14% palmitic acid, 4 to 11% α-linolenic acid, and 1.4 to 5.5% stearic acid. The fatty acid percentage of a composition described herein may be between about 50% and 70% oleic acid, e.g., 64% oleic acid. In one embodiment, the fatty acid percentages generally refer to the amount of fatty acid in the fatty acid component of a composition.

The compositions may comprise one or a mixture of the oils described herein. The composition may comprise a single oil or a combination of oils. For example, the composition may comprise equal amounts of at least two different oils. The composition may comprise unequal amounts of at least two different oils. The oil percentage of a composition may comprise about 1% to 99% of a first oil and about 1% to 99% of a second oil. For example, in any given combination, the oil percentage of a composition may comprise about 1% to 99% of any one oil. The oil percentage of a composition may comprise about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% of any one oil. In one embodiment, the fatty acid percentages generally refer to the amount of fatty acid in the fatty acid component of a composition.

In an aspect, the disclosure provides for a composition comprising about 1% to 99%, about 5% to about 80%, about 5% to about 60%, about 10% to about 50%, about 20% to about 75% of a first oil and about 1% to 99%, about 1% to 99%, about 5% to about 80%, about 5% to about 60%, about 10% to about 50%, about 20% to about 75% of a second oil. For example, a composition may comprise about 1% to 99%, about 5% to about 80%, about 5% to about 60%, about 10% to about 50%, about 20% to about 75% of a first oil; about 1% to 99%, about 1% to 99%, about 5% to about 80%, about 5% to about 60%, about 10% to about 50%, about 20% to about 75% of a second oil; and about 1% to 99%, about 1% to 99%, about 5% to about 80%, about 5% to about 60%, about 10% to about 50%, about 20% to about 75% of a third oil. A composition as described herein may comprise about 1% to 99%, about 5% to about 80%, about 5% to about 60%, about 10% to about 50%, about 20% to about 75% of a first oil; about 1% to 99%, about 1% to 99%, about 5% to about 80%, about 5% to about 60%, about 10% to about 50%, about 20% to about 75% of a second oil; and about 1% to 99%, about 1% to 99%, about 5% to about 80%, about 5% to about 60%, about 10% to about 50%, about 20% to about 75% of a third oil. In one embodiment, the fatty acid percentages generally refer to the amount of fatty acid in the fatty acid component of a composition. For example, the oil percentages of a composition described herein may be about 20% soybean oil and 80% olive oil.

The composition comprising a fatty acid may be ClinOleic® (mixture of olive oil and soybean oil). The composition comprising a fatty acid may be Clinolipid® (mixture of olive oil and soybean oil). For example, the composition comprising a fatty acid may comprise soybean oil, phospholipids, glycerin, and water. The composition comprising a fatty acid may comprise about 70%-90% olive oil, 10%-30% soybean oil, about 0.5% to 2% phospholipids, e.g., egg yolk phospholipids, about 1% to 4% glycerin, 0.01% to 0.05% sodium oleate, and water (balance). The composition comprising a fatty acid may comprise about 80% olive oil, 20% soybean oil, 1.2% phospholipids, e.g., egg yolk phospholipids, 2.25% glycerin, 0.03% sodium oleate, and water (balance). The fatty acids be free fatty acids, omega-3, omega-6, or omega-9 fatty acids. The fatty acids may be free fatty acids. The fatty acids may not comprise any omega-3, omega-6, or omega-9 fatty acids.

The composition comprising a fatty acid may be Intralipid® (mixture of soybean oil, phospholipids, glycerin, and water). For example, the composition comprising a fatty acid may comprise soybean oil, phospholipids, glycerin, and water. The composition comprising a fatty acid may comprise about 5-40% soybean oil, about 0.5%, to 2% phospholipids, e.g., egg yolk phospholipids, about 1% to 4% glycerin, and water (balance). The composition comprising a fatty acid may comprise about 10% soybean oil, 1.2% phospholipids, e.g., egg yolk phospholipids, 2.25% glycerin, and water (balance). The composition comprising a fatty acid may comprise about 30% soybean oil, 1.2% phospholipids, e.g., egg yolk phospholipids, 2.25% glycerin, and water (balance).

The composition comprising a fatty acid may comprise about 20% soybean oil, 1.2% phospholipids, e.g., egg yolk phospholipids, 2.25% glycerin, and water (balance). The fatty acids may be free fatty acids, omega-3, omega-6, or omega-9 fatty acids. The fatty acids may be free fatty acids. The fatty acids may not comprise any omega-3, omega-6, or omega-9 fatty acids.

The composition for use in the methods described herein may have a pH between about pH 6 and pH 8. The pH of the compositions described herein may be between about pH 6 and pH 7. The pH of the compositions described herein may be between about pH 7 and pH 8. The pH of the compositions described herein may be about pH 6.0, pH 6.1, pH 6.2, pH 6.3, pH 6.4, pH 6.5, pH 6.6, pH 6.7, pH 6.8, pH 6.9, pH 7.0, pH 7.1, pH 7.2, pH 7.3, pH 7.4, pH 7.5, pH 7.6, pH 7.7, pH 7.8, pH 7.9, or pH 8.0. The pH of the compositions described herein may be adjusted by the addition of a base, e.g., sodium hydroxide.

The composition may comprise a mixture of fatty acids. The composition may comprise a mixture of 1, 2, 3, 4, 5, 6, 7, 8, 9, or 10 different fatty acids. The composition may comprise a mixture of 2 different fatty acids. The composition may comprise a mixture of 3 different fatty acids. The composition may comprise a mixture of 4 different fatty acids. For example, the composition may comprise a combination of oleic acid, linoleic acid, and palmitic acid.

The composition may comprise a mixture of three fatty acids in a ratio of 1:1:1, 1:2:1, 2:1:1, or 1:1:2. The composition may comprise a mixture of fatty acids, wherein the fatty acids are oleic acid, palmitic acid, linoleic acid, or combinations thereof. The composition may comprise about 1%-99% oleic acid, 1%-99% linoleic acid, 1%-99% palmitic acid, 1%-99% stearic acid, and 1%-99% linolenic acid. For example, the composition may comprise about 50% to 90% oleic acid, about 2% to 30% linoleic acid, about 5% to 30% palmitic acid, about 0.1% to 10% stearic acid, and about 0% to 5% linolenic acid. The composition may comprise about 1%-99% oleic acid, 1%-99% linoleic acid, and 1%-99% palmitic acid. For example, the composition may comprise about 50% to 90% oleic acid, about 2% to 30% linoleic acid, and about 5% to 30% palmitic acid. The fatty acids may be free fatty acids, omega-3, omega-6, or omega-9 fatty acid. The fatty acids may be free fatty acids. The preferred composition is oleic, linoleic and palmitic acid in which oleic acid comprises 70%-80%.

The composition may comprise a mixture of fatty acids, wherein the fatty acids are oleic acid, palmitic acid, linoleic acid, or combinations thereof. The composition may comprise about 1%-99% oleic acid, 1%-99% linoleic acid, 1%-99% palmitic acid, 1%-99% stearic acid, and 1%-99% linoleic acid. For example, the composition may comprise about 50% to 90% oleic acid, about 2% to 30% linoleic acid, about 5% to 30% palmitic acid, about 0.1% to 10% stearic acid, and about 0% to 5% linoleic acid. The composition may comprise about 1%-99% oleic acid, 1%-99% linoleic acid, and 1%-99% palmitic acid. For example, the composition may comprise about 50% to 90% oleic acid, about 2% to 30% linoleic acid, and about 5% to 30% palmitic acid. The fatty acids may be free fatty acids, omega-3, omega-6, or omega-9 fatty acids. The fatty acids may be free fatty acids. The preferred composition is oleic, linoleic, and palmitic acid in which oleic acid comprises 70%-80%.

The compositions described herein may be substantially free of arachidic acid, arachidonic acid, behenic acid, brassidic acid, butyric acid, capric acid, caproic acid, caproleic acid, caprylic acid, cerotic acid, dihomo-γ-linolenic acid (DGLA), docosahexaenoic acid (DHA), docosapentaenoic acid (DPA), eicosapentaenoic acid (EPA), elaidic acid, erucic acid, gadoleic acid, lauric acid, lauroleic acid, lignoceric acid, linoelaidic acid, linolenic acid, linoleic acid, α-linoleic acid, γ-linoleic acid, mead acid, myristic acid, myristoleic acid, nervonic acid, oleic acid, palmitic acid, palmitoleic acid, pinolenic acid (columbinic acid), sapienic acid, stearic acid, vaccenic acid, α-linoleic acid, or a combination thereof.

The compositions described herein may comprise less than 1% arachidic acid, arachidonic acid, behenic acid, brassidic acid, butyric acid, capric acid, caproic acid, caproleic acid, caprylic acid, cerotic acid, dihomo-γ-linolenic acid (DGLA), docosahexaenoic acid (DHA), docosapentaenoic acid (DPA), eicosapentaenoic acid (EPA), elaidic acid, erucic acid, gadoleic acid, lauric acid, lauroleic acid, lignoceric acid, linoelaidic acid, linolenic acid, linoleic acid, α-linoleic acid, γ-linoleic acid, mead acid, myristic acid, myristoleic acid, nervonic acid, oleic acid, palmitic acid, palmitoleic acid, pinolenic acid (columbinic acid), sapienic acid, stearic acid, vaccenic acid, α-linoleic acid, or a combination thereof by w/v. The compositions described herein may comprise less than 0.1%, 0.01%, or 0.001% w/v of the aforementioned fatty acids.

The compositions described herein may be substantially free of omega-3, omega-6, or omega-9 fatty acids. The compositions described herein may be substantially free of omega-3 fatty acids, omega-6 fatty acids, omega-9 fatty acids or a combination thereof. For example, the compositions described herein may comprise less than about 1% w/w omega fatty acids. The compositions described herein may comprise less than about 1% w/w omega-3 fatty acids, omega-6 fatty acids, omega-9 fatty acids or a combination thereof. The compositions described herein may comprise less than about 0.1% w/w omega-3, omega-6, or omega-9 fatty acids. The compositions described herein may comprise less than about 0.1% w/w omega-3 fatty acids, omega-6 fatty acids, omega-9 fatty acids or a combinations thereof. The compositions described herein may comprise less than about 0.01% w/w omega fatty acids. The compositions described herein may comprise less than about 0.01% w/w omega-3 fatty acids, omega-6 fatty acids, omega-9 fatty acids or a combinations thereof.

The compositions may be substantially free of monoacylglycerols, diacylglycerols, triacylglycerols, or combinations thereof. The compositions described herein may comprise less than 0.1%, 0.01%, or 0.001% w/v monoacylglycerols, diacylglycerols, triacylglycerols, or combinations thereof.

The composition comprising a fatty acid may further comprise phospholipids, including but not limited to natural sources of phospholipids (e.g., egg yolk, soybean, rapeseed (canola), sunflower seeds, flax seed, milk, krill, wheat germ) and synthetic phospholipids, a salt (e.g., sodium oleate), water, an isotonic solution (e.g., normal saline solution, buffered saline solution, lactated Ringer's solution, 5% dextrose in water (D5W), Ringer's solution, 0.9% saline solution), a base (e.g., sodium hydroxide), glycerin, amino acid, sugar, sterol, phenolic, tocosterol, phytosterol (e.g., campesterol, avenasterol, brassicasterol, β-sitosterol, γ-sitosterol, stigmasterol), flavonoid, pinoresinol, Vitamin K, aliphatic alcohol, and combinations thereof. See, e.g., van Hoogevest & Wendel *Eur J Lipid Sci Technol.* (2014) 116(9): 1088-1107. The phospholipids may be derived from natural sources of phospholipids, including but not limited to egg yolk, soybean, rapeseed (canola), sunflower seeds, flax seed, milk, krill, wheat germ, or may be synthetic phospholipids. The isotonic solution may be normal saline solution, buffered saline solution, lactated Ringer's solution, 5% dextrose in water (D5W), Ringer's solution, or 0.9% saline solution. The phytosterol may be campesterol, avenasterol, brassicasterol, β-sitosterol, γ-sitosterol, stigmasterol, or a mixture thereof. The phenolic may be esters of tyrosol, hydroxytyrosol, oleocanthal, oleuropein, or a combination thereof.

The compositions described herein may further comprise an anti-viral drug. For example, the composition may further comprise TAMIFLU® (oseltamivir phosphate), RELENZA® (zanamivir), RAPIVAB® (peramivir), XOFLUZA® (baloxavir marboxil), Abacavir, Acycovir, Adefovir, Ampligen, Amprenavir, Umifenovir, Atzanavir, Atripla, Biktarvy, Boceprevir, Bulevirtide, Cidofovir, Cobicistate, Combivir, Daclatasvir, Darunavir, Delavirdine, Descovy, Didanosine, Docosanol, Dolutegravir, Doravirine, Edoxudine, Efavirenz, Elvitegravir, Emitcitabine, Enfuvirtide, Entecavir, Etravirine, Famciclovir, Fomivirsen, Fosmprevavir, Foscarnet, Ganciclovir, Ibacitabine, Ibalizumab, Idoxuridine, Imiquimod, Imunovir, Indinavir, Lamivudine, Letermovir, Lopinavir, Lovride, Maraviroc, Methiszone, Morxydine, Nelfinavir, Nexavir, Nitaxanide, Norvir, Oseltamivir, Penciclovir, Peramivir, Penciclovir, Peramivir, Pleconaril, Podophyllotoxin, Reltegravir, Remdesivir, Ribovirin, Rilpivirine, Rilpivirine, Rimadtadine, Ritonavir, Saquinavir, Sofosbuvir, Stavudine, Taribavirin, Telarevir, Telbivudine, Tenofovir alafenamide, Tenofovir disoproxil, Tipranavir, Tromatadine, Truvada, Umifenovir, Truvada, Umifenovir, Valaciclovir, Vicriviroc, Vidarabine, Zalcitabine, Zanamivir, Zidovudine, or a combination thereof. The composition may further comprise an RNA dependent RNA polymerase inhibitor. For example, the composition may further comprise VEKLURY® (remdesivir).

The composition comprising a fatty acid or a derivative thereof, may be administered to a subject suffering from a viral infection, before, in combination with, or after, administration of an anti-viral drug. The composition comprising a fatty acid or a derivative thereof may be administered to a subject suffering from a viral infection, about 1, 2, 3, 4, 5, 6, 7, 8, 9, or 10 days prior to administration of an antiviral drug. The composition comprising a fatty acid or a derivative thereof, may be administered to a subject suffering from a viral infection, about 1, 2, 3, 4, 5, 6, 7, 8, 9, or 10 days after administration of an antiviral drug.

Routes of Administration

The compositions comprising a fatty acid described herein may be administered subcutaneously, intramuscularly, intravenously, intraperitoneally, intrapleurally, intravesicularly, intrathecally, topically, orally, rectally, vaginally, nasally, or by a route as necessitated condition. The compositions comprising a fatty acid described herein may be infused into a subject. The composition comprising a fatty acid described herein may be administered by parenteral administration. One route of administration is intravenous. Another route of administration for the compositions described herein is nasal administration, preferably by aerosol. One route of administration for the compositions described herein is administration to an epithelial surface. For example, the compositions described herein may be administered to oral cavity, vagina, rectum, or a combination thereof. The compositions described herein may be formulated for administration to the oral cavity, vagina, rectum, or a combination thereof, for example, as an emulsion, gel, optionally vaginal gel, suppository, optionally vaginal suppository, foam, vaginal tablets, cream, optionally vaginal cream, vaginal ring, enema, optionally micro-enema, large-volume enema, by a specialized catheter, or a combination thereof.

The compositions comprising a fatty acid described herein may be administered prior to development of the acute respiratory distress syndrome (ARDS), e.g., as a prophylactic measure. For example, prior to development of symptoms of a viral infection, the subject may be administered a compositions comprising a fatty acid described herein. For example, the subject may be administered the composition comprising a linty acid described herein about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60 minutes prior to the onset of acute respiratory distress syndrome (ARDS). The subject may be administered the composition comprising a fatty acid described herein about 1, 2, 3, 4, 5, 6, or 7 days prior to the onset of acute respiratory distress syndrome (ARDS). A preferred timing for administration is at least 1 day prior to the onset of ARDS.

The compositions comprising a fatty acid described herein may be administered prior to infection by a virus, e.g., as a prophylactic measure. For example, the subject may be administered a compositions comprising a fatty acid described herein when the subject is at risk to viral infection. The subject may be administered the composition comprising a fatty acid described herein about 1, 2, 3, 4, 5, 6, or 7 days prior to the onset of viral infection. The preferred timing of administration is about 1 day prior to infection by a virus. The preferred route of administration is nasal administration.

For infusion, the composition comprising a fatty acid may be infused at a rate of between about 0.1 g lipids/kg/hour to about 5 g lipids/kg/hour. The infusion rate may be between about 1 g lipids/kg/hour to about 4 g lipids/kg/hour. The infusion rate may be between about 2 g lipids/kg/hour to about 3 g lipids/kg/hour. The infusion rate may be at about 0.1, 0.2, 0.25, 0.3, 0.35, 0.4, 0.45, 0.5, 0.55, 0.6, 0.65, 0.7, 0.75, 0.8, 0.85, 0.9, 0.95, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0 g lipids/kg/hour.

The composition comprising a fatty acid may be infused for about 1-60 minutes. The infusion may be for about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 39, 40, 41, 42, 43, 44, 45, 46, 47, 48, 49, 50, 51, 52, 53, 54, 55, 56, 57, 58, 59, 60 minutes. For example, the infusion may be for about 15 to 30 minutes, 10 minutes to 30 minutes, or 5 to 25 minutes.

The composition comprising a fatty acid may be infused for about 1-24 hours. The infusion may be for about 1, 2, 3, 4, 5, 6, 7, 8, 9, 10, 11, 12, 13, 14, 15, 16, 17, 18, 19, 20, 21, 22, 23, or 24 hours.

The composition comprising a fatty acid may be infused for about 1-10 days. The infusion may be for about 1, 2, 3, 4, 5, 6, 7, 8, 9, or 10 days.

The composition comprising a fatty acid, preferably a free fatty acid, described herein, may be administered, for example by inhalation, about 1-10 days prior to viral infection. The composition may be administered, for example by inhalation, for about 1, 2, 3, 4, 5, 6, 7, 8, 9, or 10 days prior to viral infection. An anti-viral drug may be administered prior to, concurrent with, or after administration of a composition comprising a fatty acid described herein.

The fatty acids in the compositions described herein may be free fatty acids.

Effective Amount

The effective amount of the fatty acid in the composition may range from about 0.01 mM to 10 M.

The effective amount of the fatty acid in the composition may range from about 0.01 mM and 50 mM, 0.5 mM and 250 mM, or 2 mM and 2 M. The effective amount of the fatty acid in the composition may range from about 0.1 mM and 5 M, 0.5 mM and 2.5 M, or 0.2 mM and 10 M.

The effective amount of the fatty acid in the composition may be about 0.01 mM, 0.02 mM, 0.03 mM, 0.04 mM, 0.05 mM, 0.06 mM, 0.07 mM, 0.08 mM, 0.09 mM, 0.1 mM, 0.2 mM, 0.3 mM, 0.4 mM, 0.5 mM, 0.6 mM, 0.7 mM, 0.8 mM, 0.9 mM, 1 mM, 2 mM, 3 mM, 4 mM, 5 mM, 6 mM, 7 mM, 8 mM, 9 mM, 10 mM, 11 mM, 12 mM, 13 mM, 14 mM, 15 mM, 16 mM, 17 mM, 18 mM, 19 mM, 20 mM, 21 mM, 22 mM, 23 mM, 24 mM, 25 mM, 26 mM, 27 mM, 28 mM, 29 mM, 30 mM, 31 mM, 32 mM, 33 mM, 34 mM, 35 mM, 36 mM, 37 mM, 38 mM, 39 mM, 40 mM, 41 mM, 42 mM, 43 mM, 44 mM, 45 mM, 46 mM, 47 mM, 48 mM, 49 mM, 50 mM, 51 mM, 52 mM, 53 mM, 54 mM, 55 mM, 56 mM, 57 mM, 58 mM, 59 mM, 60 mM, 61 mM, 62 mM, 63 mM, 64 mM, 65 mM, 66 mM, 67 mM, 68 mM, 69 mM, 70 mM, 71 mM, 72 mM, 73 mM, 74 mM, 75 mM, 76 mM, 77 mM, 78 mM, 79 mM, 80 mM, 81 mM, 82 mM, 83 mM, 84 mM, 85 mM, 86 mM, 87 mM, 88 mM, 89 mM, 90 mM, 91 mM, 92 mM, 93 mM, 94 mM, 95 mM, 96 mM, 97 mM, 98 mM, 99 mM, 100 mM, 125 mM, 150 mM, 200 mM, 250 mM, 300 mM, 350 mM, 400 mM, 450 mM, 500 mM, 550 mM, 600 mM, 650 mM, 700 mM, 750 mM, 800 mM, 850 mM, 900 mM, 950 mM, or 1 M. The concentration may be about 0.1 M, 0.2 M, 0.3 M, 0.4 M, 0.5 M, 0.6 M, 0.7 M, 0.8 M, 0.9 M, 1 M, 2 M, 3 M, 4 M, 5 M, 6 M, 7 M, 8 M, 9 M, or 10 M.

The effective amount of the fatty acid in the composition may range from about 1 nanogram (ng) to 1 gram (g).

The effective amount of the fatty acid in the composition may be about 1 ng to 1,000 ng.

The effective amount may be between about 1 ng and 100 ng, 10 ng and 500 ng, 200 ng and 800 ng, or 250 ng and 750 ng.

The effective amount of the fatty acid in the composition may be about 1 ng, 2 ng, 3 ng, 4 ng, 5 ng, 6 ng, 7 ng, 8 ng, 9 ng, 10 ng, 11 ng, 12 ng, 13 ng, 14 ng, 15 ng, 16 ng, 17 ng, 18 ng, 19 ng, 20 ng, 21 ng, 22 ng, 23 ng, 24 ng, 25 ng, 26 ng, 27 ng, 27 ng, 28 ng, 29 ng, 30 ng, 31 ng, 32 ng, 33 ng, 34 ng, 35 ng, 36 ng, 37 ng, 38 ng, 39 ng, 40 ng, 41 ng, 42 ng, 43 ng, 44 ng, 45 ng, 46 ng, 47 ng, 48 ng, 49 ng, 50 ng, 51 ng, 52 ng, 53 ng, 54 ng, 55 ng, 56 ng, 57 ng, 58 ng, 59 ng, 60 ng, 61 ng, 62 ng, 63 ng, 64 ng, 65 ng, 66 ng, 67 ng, 68 ng, 69 ng, 70 ng, 71 ng, 72 ng, 73 ng, 74 ng, 75 ng, 76 ng, 77 ng, 78 ng, 79 ng, 80 ng, 81 ng, 82 ng, 83 ng, 84 ng, 85 ng, 86 ng, 87 ng, 88 ng, 89 ng, 90 ng, 91 ng, 92 ng, 93 ng, 94 ng, 95 ng, 96 ng, 97 ng, 98 ng, 99 ng, 100 ng, 110 ng, 120 ng, 130 ng, 140 ng, 150 ng, 160 ng, 170 ng, 180 ng, 190 ng, 200 ng, 210 ng, 220 ng, 230 ng, 240 ng, 250 ng, 260 ng, 270 ng, 280 ng, 290 ng, 300 ng, 310 ng, 320 ng, 330 ng, 340 ng, 350 ng, 360 ng, 370 ng, 380 ng, 390 ng, 400 ng, 410 ng, 420 ng, 430 ng, 440 ng, 450 ng, 460 ng, 470 ng, 480 ng, 490 ng, 500 ng, 525 ng, 550 ng, 575 ng, 600 ng, 625 ng, 650 ng, 675 ng, 700 ng, 725 ng, 750 ng, 775 ng, 800 ng, 825 ng, 850 ng, 875 ng, 900 ng, 950 ng, or 975 ng.

The effective amount of the fatty acid in the composition may be about 1 mg to 1,000 mg.

The effective amount may be between about 1 mg and 100 mg, 10 mg and 500 mg, 200 mg and 800 mg, or 250 mg and 750 mg.

The effective amount of the fatty acid in the composition may be about 1 mg, 2 mg, 3 mg, 4 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, 20 mg, 21 mg, 22 mg, 23 mg, 24 mg, 25 mg, 26 mg, 27 mg, 28 mg, 29 mg, 30 mg, 31 mg, 32 mg, 33 mg, 34 mg, 35 mg, 36 mg, 37 mg, 38 mg, 39 mg, 40 mg, 41 mg, 42 mg, 43 mg, 44 mg, 45 mg, 46 mg, 47 mg, 48 mg, 49 mg, 50 mg, 51 mg, 52 mg, 53 mg, 54 mg, 55 mg, 56 mg, 57 mg, 58 mg, 59 mg, 60 mg, 61 mg, 62 mg, 63 mg, 64 mg, 65 mg, 66 mg, 67 mg, 68 mg, 69 mg, 70 mg, 71 mg, 72 mg, 73 mg, 74 mg, 75 mg, 76 mg, 77 mg, 78 mg, 79 mg, 80 mg, 81 mg, 82 mg, 83 mg, 84 mg, 85 mg, 86 mg, 87 mg, 88 mg, 89 mg, 90 mg, 91 mg, 92 mg, 93 mg, 94 mg, 95 mg, 96 mg, 97 mg, 98 mg, 99 mg, 100 mg, 110 mg, 120 3 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 410 mg, 420 mg, 430 mg, 440 mg, 450 mg, 460 mg, 470 mg, 480 mg, 490 mg, 500 mg, 525 mg, 550 mg, 575 mg, 600 mg, 625 mg, 650 mg, 675 mg, 700 mg, 725 mg, 750 mg, 775 mg, 800 mg, 825 mg, 850 mg, 875 mg, 900 mg, 950 mg, or 975 mg.

The effective amount of the fatty acid in the composition may be about 1 g to 1,000 g.

The effective amount may be between about 1 g and 100 g, 10 g and 500 g, 200 g and 800 g, or 250 g and 750 g.

The effective amount of the fatty acid in the composition may be about 1 g, 2 g, 3 g, 4 g, 5 g, 6 g, 7 g, 8 g, 9 g, 10 g, 11 g, 12 g, 13 g, 14 g, 15 g, 16 g, 17 g, 18 g, 19 g, 20 g, 21 g, 22 g, 23 g, 24 g, 25 g, 26 g, 27 g, 28 g, 29 g, 30 g, 31 g, 32 g, 33 g, 34 g, 35 g, 36 g, 37 g, 38 g, 39 g, 40 g, 41 g, 42 g, 43 g, 44 g, 45 g, 46 g, 47 g, 48 g, 49 g, 50 g, 51 g, 52 g, 53 g, 54 g, 55 g, 56 g, 57 g, 58 g, 59 g, 60 g, 61 g, 62 g, 63 g, 64 g, 65 g, 66 g, 67 g, 68 g, 69 g, 70 g, 71 g, 72 g, 73 g, 74 g, 75 g, 76 g, 77 g, 78 g, 79 g, 80 g, 81 g, 82 g, 83 g, 84 g, 85 g, 86 g, 87 g, 88 g, 89 g, 90 g, 91 g, 92 g, 93 g, 94 g, 95 g, 96 g, 97 g, 98 g, 99 g, 100 g, 110 g, 120 g, 130 g, 140 g, 150 g, 160 g, 170 g, 180 g, 190 g, 200 g, 210 g, 220 g, 230 g, 240 g, 250 g, 260 g, 270 g, 280 g, 290 g, 300 g, 310 g, 320 g, 330 g, 340 g, 350 g, 360 g, 370 g, 380 g, 390 g, 400 g, 410 g, 420 g, 430 g, 440 g, 450 g, 460 g, 470 g, 480 g, 490 g, 500 g, 525 g, 550 g, 525 g, 600 g, 625 g, 650 g, 675 g, 700 g, 725 g, 750 g, 775 g, 800 g, 825 g, 850 g, 875 g, 900 g, 950 g, or 975 g.

The effective amount of the fatty acid in the composition may range from about 1 nanogram per ML (ng/mL) to 1 gram per mL (g/mL).

The effective amount of the fatty acid in the composition may be about 1 ng/mL to 1,000 ng/mL.

The effective amount may be between about 1 ng/mL and 100 ng/mL, 10 ng/mL and 1,000 ng/mL, 200 ng/mL and 800 ng/mL, or 250 ng/mL and 750 ng/mL.

The effective amount of the fatty acid in the composition may be about 1 ng/mL, 2 ng/mL, 3 ng/mL, 4 ng/mL, 5 ng/mL, 6 ng/mL, 7 ng/mL, 8 ng/mL, 9 ng/mL, 10 ng/mL, 11 ng/mL, 12 ng/mL, 13 ng/mL, 14 ng/mL, 15 ng/mL, 16 ng/mL, 17 ng/mL, 18 ng/mL, 19 ng/mL, 20 ng/mL, 21 ng/mL, 22 ng/mL, 23 ng/mL, 24 ng/mL, 25 ng/mL, 26 ng/mL, 27 ng/mL, 28 ng/mL, 29 ng/mL, 30 ng/mL, 31 ng/mL, 32 ng/mL, 33 ng/mL, 34 ng/mL, 35 ng/mL, 36 ng/mL, 37 ng/mL, 38 ng/mL, 39 ng/mL, 40 ng/mL, 41 ng/mL, 42 ng/mL, 43 ng/mL, 44 ng/mL, 45 ng/mL, 46 ng/mL, 47 ng/mL, 48 ng/mL, 49 ng/mL, 50 ng/mL, 51 ng/mL, 52 ng/mL, 53 ng/mL, 54 ng/mL, 55 ng/mL, 56 ng/mL, 57 ng/mL, 58 ng/mL, 59 ng/mL, 60 ng/mL, 61 ng/mL, 62 ng/mL, 63 ng/mL, 64 ng/mL, 65 ng/mL, 66 ng/mL, 67 ng/mL, 68 ng/mL, 69 ng/mL, 70 ng/mL, 71 ng/mL, 72 ng/mL, 73 ng/mL, 74 ng/mL, 75 ng/mL, 76 ng/mL, 77 ng/mL, 78 ng/mL, 79 ng/mL, 80 ng/mL, 81 ng/mL, 82 ng/mL, 83 ng/mL, 84 ng/mL, 85 ng/mL, 86 ng/mL, 87 ng/mL, 88 ng/mL, 89 ng/mL, 90 ng/mL, 91 ng/mL, 92 ng/mL, 93 ng/mL, 94 ng/mL, 95 ng/mL, 96 ng/mL, 97 ng/mL, 98 ng/mL, 99 ng/mL, 100 ng/mL, 110 ng/mL, 120 ng/mL, 130 ng/mL, 140 ng/mL, 150 ng/mL, 160 ng/mL, 170 ng/mL, 180 ng/mL, 190 ng/mL, 200 ng/mL, 210 ng/mL, 220 ng/mL, 230 ng/mL, 240 ng/mL, 250 ng/mL, 260 ng/mL, 270 ng/mL, 280 ng/mL, 290 ng/mL, 300 ng/mL, 310 ng/mL, 320 ng/mL, 330 ng/mL, 340 ng/mL, 350 ng/mL, 360 ng/mL, 370 ng/mL, 380 ng/mL, 390 ng/mL, 400 ng/mL, 410 ng/mL, 420 ng/mL, 430 ng/mL, 440 ng/mL, 450 ng/mL, 460 ng/mL, 470 ng/mL, 480 ng/mL, 490 ng/mL, 500 ng/mL, 525 ng/mL, 550 ng/mL, 575 ng/mL, 600 ng/mL, 625 ng/mL, 650 ng/mL, 675 ng/mL, 700 ng/mL, 725 ng/mL, 750 ng/mL, 775 ng/mL, 800 ng/mL, 825 ng/mL, 850 ng/mL, 875 ng/mL, 900 ng/mL, 950 ng/mL, or 975 ng/mL.

The effective amount of the fatty acid in the composition may be about 1 mg/mL to 1,000 mg/mL.

The effective amount may be between about 1 mg/mL and 100 mg/mL, 10 mg/mL and 500 mg/mL, 200 mg/mL and 800 mg/mL, or 250 mg/mL and 750 mg/mL.

The effective amount of the fatty acid in the composition may be about 1 mg/mL, 2 mg/mL, 3 mg/mL, 4 mg/mL, 5 mg/mL, 6 mg/mL, 7 mg/mL, 8 mg/mL, 9 mg/mL, 10 mg/mL, 11 mg/mL, 12 mg/mL, 13 mg/mL, 14 mg/mL, 15 mg/mL, 16 mg/mL, 17 mg/mL, 18 mg/mL, 19 mg/mL, 20 mg/mL, 21 mg/mL, 22 mg/mL, 23 mg/mL, 24 mg/mL, 25 mg/mL, 26 mg/mL, 27 mg/mL, 28 mg/mL, 29 mg/mL, 30 mg/mL, 31 mg/mL, 32 mg/mL, 33 mg/mL, 34 mg/mL, 35 mg/mL, 36 mg/mL, 37 mg/mL, 38 mg/mL, 39 mg/mL, 40 mg/mL, 41 mg/mL, 42 mg/mL, 43 mg/mL, 44 mg/mL, 45 mg/mL, 46 mg/mL, 47 mg/mL, 48 mg/mL, 49 mg/mL, 50 mg/mL, 51 mg/mL, 52 mg/mL, 53 mg/mL, 54 mg/mL, 55 mg/mL, 56 mg/mL, 57 mg/mL, 58 mg/mL, 59 mg/mL, 60 mg/mL, 61 mg/mL, 62 mg/mL, 63 mg/mL, 64 mg/mL, 65 mg/mL, 66 mg/mL, 67 mg/mL, 68 mg/mL, 69 mg/mL, 70 mg/mL, 71 mg/mL, 72 mg/mL, 73 mg/mL, 74 mg/mL, 75 mg/mL, 76 mg/mL, 77 mg/mL, 78 mg/mL, 79 mg/mL, 80 mg/mL, 81 mg/mL, 82 mg/mL, 83 mg/mL, 84 mg/mL, 85 mg/mL, 86 mg/mL, 87 mg/mL, 88 mg/mL, 89 mg/mL, 90 mg/mL, 91 mg/mL, 92 mg/mL, 93 mg/mL, 94 mg/mL, 95 mg/mL, 96 mg/mL, 97 mg/mL, 98 mg/mL, 99 mg/mL, 100 mg/mL, 110 mg/mL, 120 mg/mL, 130 mg/mL, 140 mg/mL, 150 mg/mL, 160 mg/mL, 170 mg/mL, 180 mg/mL, 190 mg/mL, 200 mg/mL, 210 mg/mL, 220 mg/mL, 230 mg/mL, 240 mg/mL, 250 mg/mL, 260 mg/mL, 270 mg/mL, 280 mg/mL, 290 mg/mL, 300 mg/mL, 310 mg/mL, 320 mg/mL, 330 mg/mL, 340 mg/mL, 350 mg/mL, 360 mg/mL, 370 mg/mL, 380 mg/mL, 390 mg/mL, 400 mg/mL, 410 mg/mL, 420 mg/mL, 430 mg/mL, 440 mg/mL, 450 mg/mL, 460 mg/mL, 470 mg/mL, 480 mg/mL, 490 mg/mL, 500 mg/mL, 525 mg/mL, 550 mg/mL, 575 mg/mL, 600 mg/mL, 625 mg/mL, 650 mg/mL, 675 mg/mL, 700 mg/mL, 725 mg/mL, 750 mg/mL, 775 mg/mL, 800 mg/mL, 825 mg/mL, 850 mg/mL, 875 mg/mL, 900 mg/mL, 950 mg/mL, or 975 mg/mL.

The effective amount of the fatty acid in the composition may be about 1 g/mL to 1,000 g/mL.

The effective amount may be between about 1 g/mL and 100 g/mL, 10 g/mL and 500 g/mL, 200 g/mL and 800 g/mL, or 250 g/mL and 750 g/mL.

The effective amount of the fatty acid in the composition may be about 1 g/mL, 2 g/mL, 3 g/mL, 4 g/mL, 5 g/mL, 6 g/mL, 7 g/mL, 8 g/mL, 9 g/mL, 10 g/mL, 11 g/mL, 12 g/mL, 13 g/mL, 14 g/mL, 15 g/mL, 16 g/mL, 17 g/mL, 18 g/mL, 19 g/mL, 20 g/mL, 21 g/mL, 22 g/mL, 23 g/mL, 24 g/mL, 25 g/mL, 26 g/mL, 27 g/mL, 28 g/mL, 29 g/mL, 30 g/mL, 31 g/mL, 32 g/mL, 33 g/mL, 34 g/mL, 35 g/mL, 36 g/mL, 37 g/mL, 38 g/mL, 39 g/mL, 40 g/mL, 41 g/mL, 42 g/mL, 43 g/mL, 44 g/mL, 45 g/mL, 46 g/mL, 47 g/mL, 48 g/mL, 49 g/mL, 50 g/mL, 51 g/mL, 52 g/mL, 53 g/mL, 54 g/mL, 55 g/mL, 56 g/mL, 57 g/mL, 58 g/mL, 59 g/mL, 60 g/mL, 61 g/mL, 62 g/mL, 63 g/mL, 64 g/mL, 65 g/mL, 66 g/mL, 67 g/mL, 68 g/mL, 69 g/mL, 70 g/mL, 71 g/mL, 72 g/mL, 73 g/mL, 74 g/mL, 75 g/mL, 76 g/mL, 77 g/mL, 78 g/mL, 79 g/mL, 80 g/mL, 81 g/mL, 82 g/mL, 83 g/mL, 84 g/mL, 85 g/mL, 86 g/mL, 87 g/mL, 88 g/mL, 89 g/mL, 90 g/mL, 91 g/mL, 92 g/mL, 93 g/mL, 94 g/mL, 95 g/mL, 96 g/mL, 97 g/mL, 98 g/mL, 99 g/mL, 100 g/mL, 110 g/mL, 120 g/mL, 130 g/mL, 140 g/mL, 150 g/mL, 160 g/mL, 170 g/mL, 180 g/mL, 190 g/mL, 200 g/mL, 210 g/mL, 220 g/mL, 230 g/mL, 240 g/mL, 250 g/mL, 260 g/mL, 270 g/mL, 280 g/mL, 290 g/mL, 300 g/mL, 310 g/mL, 320 g/mL, 330 g/mL, 340 g/mL, 350 g/mL, 360 g/mL, 370 g/mL, 380 g/mL, 390 g/mL, 400 g/mL, 410 g/mL, 420 g/mL, 430 g/mL, 440 g/mL, 450 g/mL, 460 g/mL, 470 g/mL, 480 g/mL, 490 g/mL, 500 g/mL, 525 g/mL, 550 g/mL, 575 g/mL, 600 g/mL, 625 g/mL, 650 g/mL, 675 g/mL, 700 g/mL, 725 g/mL, 750 g/mL, 775 g/mL, 800 g/mL, 825 g/mL, 850 g/mL, 875 g/mL, 900 mg/mL, 950 g/mL, or 975 g/mL.

The effective amount of the fatty acid for treatment or prevention of a viral infection may be an amount sufficient to interfere with binding of a virus to a host cell. The effective amount of the fatty acid for treatment or prevention of a viral infection may be an amount sufficient to reduce or prevent the transmission of a virus from an infected individual to an uninfected individual.

The dose used in a particular formulation or application will be determined by the requirements of the particular type of disease and the constraints imposed by the characteristics and capacities of the carrier materials Pharmaceutical Compositions The compositions described herein may be formulated as a pharmaceutical composition comprising a fatty acid and pharmaceutically acceptable carrier. The preferred carrier is an aqueous medium such as saline. Pharmaceutically acceptable carriers include, but are not limited to, excipient, lubricant, emulsifier, stabilizer, solvent, diluent, buffer, vehicle, or a combination thereof.

Pharmaceutically acceptable antioxidants included, but are not limited to ascorbic acid (vitamin C), glutathione, lipoic acid, uric acid, carotenes, including β-carotene and retinol (vitamin A), α-tocopherol (vitamin E), ubiquinol (coenzyme Q), butylated hydroxyanisole (BHA), butylated hydroxytoluene (BHT), propyl gallate (PG), tert-butylhydroquinone (TBHQ), lutein, selenium, manganese, zeaxanthin, or a combination thereof. The antioxidant may be α-tocopherol (vitamin E).

Pharmaceutically acceptable carriers are well known in the art and include, for example, aqueous solutions such as water or physiologically buffered saline or other solvents or vehicles such as glycols, glycerol, oils such as olive oil or injectable organic esters. Pharmaceutically acceptable carriers may be a liquid, including but not limited to water and oils, including those of petroleum, animal, vegetable or synthetic origin, such as peanut oil, soybean oil, mineral oil, and sesame oil. The pharmaceutical carriers may be saline, gum acacia, gelatin, starch paste, talc, keratin, colloidal silica, or urea. In addition, auxiliary, stabilizing, thickening, lubricating and coloring agents may be used. Further, nutritional ingredients may be included in the pharmaceutical composition. For example, sugars and/or amino acids may be admixed into the pharmaceutical composition. The pharmaceutical composition may comprise water, glycerin, phospholipids, or a mixture thereof. Other examples of suitable pharmaceutical carriers are described in Remington's Pharmaceutical Sciences (Alfonso Gennaro ed., Krieger Publishing Company (1997); Remington's: The Science and Practice of Pharmacy, 21$^{st}$ Ed. (Lippincot, Williams & Wilkins (2005); Modern Pharmaceutics, vol. 121 (Gilbert Banker and Christopher Rhodes, CRC Press (2002).

The compositions described herein may be formulated for administration to the oral cavity, vagina, rectum, or a combination thereof, for example, as an emulsion, gel, optionally vaginal gel, suppository, optionally vaginal suppository, foam, vaginal tablets, cream, optionally vaginal cream, vaginal ring, enema, optionally micro-enema, large-volume enema, by a specialized catheter, or a combination thereof.

The composition comprising a fatty acid may be an emulsion. The compositions described herein may be an emulsion of a fatty acid, or a combination of fatty acids, in an aqueous solution. The composition may comprise about 1%-99% fatty acids w/v in an aqueous solution. For example, the composition may comprise about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% fatty acids w/v in an aqueous solution. The composition may comprise about 10% to 50% fatty acids w/v in an aqueous solution. The composition may comprise about 25% to 40% fatty acids w/v in an aqueous solution. The composition may comprise about 10% to 20% fatty acids w/v in an aqueous solution. The composition may comprise about 1% to 50% fatty acids w/v in an aqueous solution. The composition may comprise about 1% to 25% fatty acids w/v in an aqueous solution. The aqueous solution may be an isotonic solution. The aqueous solution may be water, saline, normal saline solution, buffered saline solution, lactated Ringer's solution, 5% dextrose in water (D5W), Ringer's solution, or 0.9% saline solution.

The free fatty acids described herein may be formulated in liposomes, aerosols, miscelles, emulsions, and mixtures thereof.

The free fatty acids described herein may be conjugated to a protein carrier. The protein carrier may be albumin, for example, bovine scrum albumin (BSA).

Synthetic hydrophilic carrier, including but not limited to polyethylene glycol (PEG) or Polyvinylpyrrolidone (PVP).

To facilitate administration, the fatty acids according to the disclosure can be made into a pharmaceutical composition or made into an implant appropriate for administration in vivo, with appropriate carriers or diluents, which further can be pharmaceutically acceptable. The means of making such a composition or an implant have been described in the art (See, for instance, Remington's Pharmaceutical Sciences, 16th Ed., Mack, Ed. (1980)). Where appropriate, the fatty acid can be formulated into a preparation in semisolid or liquid form, such as a capsule, solution, injection, inhalant, or aerosol, in the usual ways for their respective route of administration. Means known in the art can be utilized to prevent or minimize release and absorption of the composition until it reaches the target tissue or organ, or to ensure timed-release of the composition.

The fatty acids and derivatives described herein may be formulated as an anti-viral composition for use in treatment, including, prevention of, viral infections, preferably respiratory viral infections. For example, the fatty acids and derivatives described herein may be formulated with an anti-viral drug for administration to a subject at risk for viral infection. The fatty acids and derivatives described herein may be formulated with an anti-viral drug for administration to a subject with a viral infection. The fatty acids and derivatives described herein surprisingly lessen the effects of the viral infection, and, may be used as a prophylactic to prevent infection by a virus.

EXAMPLES

Example 1

Increased Survivability

Experimental Design: Animals will be treated with an intravenous (IV) injection of Intralipid® (lipid emulsion), Clinoleic® (lipid emulsion), or vehicle control 30 minutes prior to placement in a chamber with lethal hypoxia levels (5% $O_2$) for 1 hour. Naïve adult mice will be used as the Experimental animals. Percentage of survival and key physiological parameters, e.g., HR, BP, $O_2$ saturation, will be examined as the primary endpoints to assess hypoxia tolerance.

TABLE 2

Experimental Design for Increased Survivability

| Treatment | Route of Administration | Time of Administration | Treatment Dose | Number of Animals |
|---|---|---|---|---|
| Vehicle (Saline) | Intravenous | 30 min pre-treatment | 3-6 ml/kg | 10 |
| 20% w/v Intralipid ® (lipid emulsion) | Intravenous | 30 min pre-treatment | 3-6 ml/kg | 10 |
| 20% w/v Clinolipid ® (lipid emulsion) | Intravenous | 30 min pre-treatment | 3-6 ml/kg | 10 |

The upregulation of fatty acids can be achieved using Intralipid® (intravenous fat emulsion) or Clinoleic® formulations of lipids. The lipid formulations improved survivability to hypoxic exposure. Increased survivability to hypoxic conditions supports the use of compositions comprising fatty acids to treat subjects suffering from acute respiratory distress syndrome (ARDS).

Example 2

Increased HIF-1α Expression

Experimental Design: Transgenic once expressing HIF-1α tagged with green fluorescent protein (GFP), will be pre-treated intravenously with an Intralipid® (lipid emulsion), Clinolipid® (lipid emulsion), or vehicle control. The experimental animals are Naïve adult transgenic mice expressing GFP-tagged HIF-1α. Animals are then be placed in a hypoxia chamber (7% $O_2$) for 5 days. HIF-1α expression will be determined through direct visualization and quantification of luminescence.

TABLE 3

Experimental Design for HIF-1α Expression Measurement

| Treatment | Route of Administration | Time of Administration | Treatment Dose | Number of Animals |
|---|---|---|---|---|
| Vehicle (Saline) | Intravenous | 30 min pre-treatment | 3-6 ml/kg | 10 |
| 20% w/v Intralipid ® (lipid emulsion) | Intravenous | 30 min pre-treatment | 3-6 ml/kg | 10 |
| 20% w/v Clinolipid ® (lipid emulsion) | Intravenous | 30 min pre-treatment | 3-6 ml/kg | 10 |

HIF-1α expression, a prominent mediator of the hypoxia response, during hypoxic exposure was upregulated in response to administration of composition comprising a fatty acid. The lipid formulations increased HIF-1α expression. Increased HIF-1α expression supports the use of compositions comprising fatty acids to treat subjects suffering from acute respiratory distress syndrome (ARDS).

Example 3

Tolerability and Cytokine Expression

Experimental Design: Animals will be placed in a chamber with sublethal hypoxia levels (7% $O_2$) for 5 days and treated daily with an intravenous (IV) injection of Intralipid® (lipid emulsion), Clinoleic® (lipid emulsion), or vehicle control. Naïve adult mice will be used as the Experimental animals. Weight, body temperature, vital signs, routine labs, health score, HIF expression, histology (H&E, pimidizole, TUNEL), and plasma lipid profiles, will be examined to assess hypoxia tolerance. In addition, expression of cytokines and other inflammatory markers will be assessed to gauge whether fatty acid treatments attenuate the immune response. Examples of measured cytokines would be: IL-1beta, IL-6, TNF-alpha.

Example 4

Prevention of Viral Transmission

Experimental Deign: Animals will be pre-treated with a free fatty acid-lipid emulsion by nasal administration about 1-24 hours or daily for 3 days prior to infection with a respiratory virus, e.g., SARS CoV-2.

Animals may be tested 1-3 days post-infection for signs of infection. The free-fatty acids described herein may prevent the infection of the animal by the virus, e.g., SARS CoV-2.

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

What is claimed is:

1. A method for treating a subject suffering from acute respiratory distress syndrome (ARDS) comprising administering a composition comprising an effective amount of a free fatty acid, a derivative thereof, or a combination thereof to a subject in need,
   wherein the composition comprises a combination of oleic acid, linoleic acid, and palmitic acid; and
   wherein the subject is suffering from a viral infection.

2. The method of claim 1, wherein the viral infection is coronavirus, influenza A virus, influenza B virus, enterovirus, respiratory syncytial virus (RSV), parainfluenza, adenovirus, or a combination thereof.

3. The method of claim 2, wherein the coronavirus is SARS-CoV, MERS-CoV, SARS-CoV-2/COVID-19, or a combination thereof.

4. The method of claim 3, wherein the coronavirus is SARS-CoV2/COVID-19.

5. The method of claim 1, wherein the fatty acid derivative is a Coenzyme A (CoA) fatty acid derivative or a synthetic homologues thereof.

6. The method of claim 1, wherein the fatty acid is a saturated fatty acid.

7. The method of claim 1, wherein the fatty acid is an unsaturated fatty acid.

8. The method of claim 1, wherein the composition is a pharmaceutical composition comprising an effective amount of a fatty acid and a carrier.

9. The method of claim 8, wherein the carrier is an excipient, lubricant, antioxidant, emulsifier, stabilizer, solvent, diluent, buffer, vehicle, or a combination thereof.

10. The method of claim 1, wherein the composition further comprises a phospholipid, water, isotonic solution, glycerin, salt, base, amino acid, sugar, antioxidant, or a mixture thereof.

11. The method of claim 1, wherein the composition is formulated for administration to the oral cavity, larynx, nasal cavity, optionally sinus, lungs, vagina, rectum, or a combination thereof.

12. The method of claim 1, wherein the composition is formulated an emulsion, gel, optionally vaginal gel, suppository, optionally vaginal suppository, foam, vaginal tablets, cream, optionally vaginal cream, vaginal ring, enema, optionally micro-enema, large-volume enema, for administration by a specialized catheter, aerosol, mist, or a combination thereof.

13. The method of claim 1, wherein the composition is substantially free of arachidic acid, arachidonic acid, behenic acid, brassidic acid, butyric acid, capric acid, caproic acid, caproleic acid, caprylic acid, cerotic acid, dihomo-γ-linolenic acid (DGLA), linolenic acid, docosahexaenoic acid (DHA), docosapentaenoic acid (DPA), eicosapentaenoic acid (EPA), elaidic acid, eurcic acid, gadoleic acid, lauric acid, lauroleic acid, lignoceric acid, linoelaidic acid, α-linoleic acid, γ-linoleic acid, mead acid, myristic acid, myristoleic acid, nervonic acid, palmitoleic acid, pinolenic acid (columbinic acid), sapienic acid, stearic acid, vaccenic acid, «-linoleic acid, or a combination thereof.

14. The method of claim 1, wherein the composition is substantially free of triglycerides.

15. The method of claim 1, wherein the composition comprising a fatty acid is an emulsion.

16. The method of claim 1, wherein the administration comprises subcutaneous, intramuscular, intravenous, intraperitoneal, intrapleural, intravesicular, intrathecal, topical, nasal, inhalation, oral administration, or a combination of routes.

17. The method of claim 1, wherein the composition further comprises an anti-viral drug.

* * * * *